Patented Jan. 28, 1936

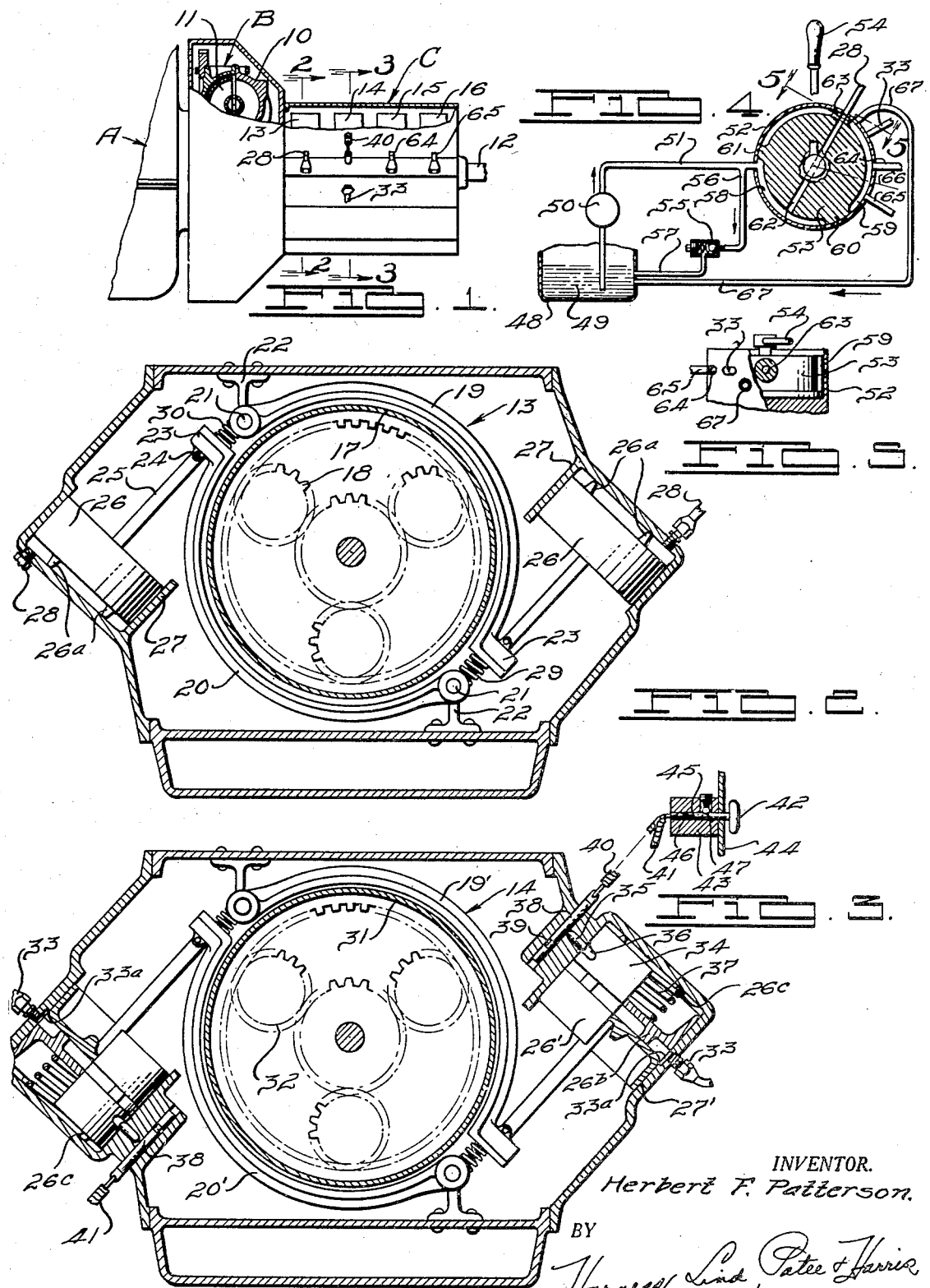

2,029,118

UNITED STATES PATENT OFFICE 2,029,118

DRIVING MECHANISM

Herbert F. Patterson, Detroit, Mich., assignor to Chrysler Corporation, Detroit, Mich., a corporation of Delaware Application January 25, 1934, Serial No. 708,233

25 Claims. (Cl. 74—262)

This invention relates to driving mechanisms and refers more particularly to improvements in means for driving motor cars or vehicles.

My invention is especially adapted for use with motor vehicles having epicyclic or planetary transmissions or other transmissions or similar speed ratio changing devices equipped with fluid pressure actuating devices. Thus, for example, where an epicyclic transmission is employed with the usual speed ratio controlling clutch or brakes for the various drums or rotary elements for the gear trains, it is sometimes preferred to actuate these transmission controlling clutches by fluid pressure. Where oil is used as the fluid, the pressure of the oil is preferably above atmospheric pressure and where air is used the pressure may be greater than atmospheric or less than atmospheric by utilizing the partial vacuum created in the usual engine intake manifold or by other means.

It sometimes happens, in fluid pressure systems of the aforesaid character, that a failure occurs in the system with the result that the transmission controlling clutches cannot be operated. Such failures may be brought about by failure of the engine, breakage of the pump which places the clutch controlling fluid under pressure line, or for many other reasons which will be readily apparent.

My invention has, among its objects, the provision of an auxiliary or safety controlling means whereby one or more of the transmission controlling elements, such as clutches in the foregoing example, may be operated independently of the usual controlling system for such clutches.

A further object of my invention resides in the provision of means under the control of the operator for supplementing the normal operation of one or more of the transmission controlling clutches, such supplemental operating means preferably being independent in the operation thereof with respect to the normal operating means.

By reason of my invention, the engine may be coupled with the vehicle driving wheels through the transmission so that the engine will serve as a brake even when the engine fails to operate normally or when the transmission operating system fails.

Further objects and advantages of my invention will be apparent from the following detailed description of one illustrative embodiment thereof, reference being had to the accompanying drawing in which:

Fig. 1 is an elevational view of a typical engine, clutch, and epicyclic transmission embodying my invention, parts of the clutch and transmission casings being broken away.

Fig. 2 is a sectional elevational view of one of the transmission controlling clutches, the section being taken through line 2—2 of Fig. 1.

Fig. 3 is a sectional elevational view through another of the transmission controlling clutches, illustrating my auxiliary controlling means applied thereto, the section being taken along the line 3—3 of Fig. 1.

Fig. 4 is a diagrammatic view of the fluid pressure control system for normally selectively operating the transmission controlling clutches.

Fig. 5 is a detail view partly in section through line 5—5 of Fig. 4 illustrating the pressure chamber in the distributing valve.

Referring to the drawing, it will be noted that I have elected to illustrate my driving mechanism in combination with a motor vehicle in which A represents a portion of the usual engine shown in Fig. 1 as being adapted to drive a clutch B. This clutch is illustrated as the fluid coupling type having the well-known driving vane member 10 and vane member 11 driven therefrom through the medium of a suitable fluid circulated between the clutch members to form the coupling therebetween.

The clutch B is adapted to drive a speed ratio changing transmission C, the drive being taken therefrom by a shaft 12 which may drivingly connect the rear wheels (not shown) of the motor vehicle in any suitable well-known manner. The transmission C is preferably a planetary type having a plurality of speed ratio controlling clutches or brakes for the drums or elements associated with the various planetary gear trains, these controlling clutches being indicated in Fig. 1 at 13, 14, 15, and 16. Thus, when the controlling clutch or brake 13 is actuated in a manner hereinafter more apparent, transmission C is actuated in its high speed or high gear ratio, and likewise the clutches or brakes 14, 15, and 16 are respectively adapted to control the transmission for the second, first, and reverse speeds or gear ratios. The high speed controlling clutch 13 may, according to generally desired practice in transmission gearings, provide a direct drive through the transmission. I desire to point out that the term "speed ratio", or "gear ratio", or equivalent terms as used in my specification and claims are used in a broad sense and include any speed ratio such as direct or 1 to 1 as well as speed ratios greater and less than 1 to 1.

Referring to Fig. 2, I have illustrated in cross section and in somewhat diagrammatic form the manner of normally actuating one of the controlling clutches or brakes such as the brake 13 for high speed. 17 represents the drum of the high speed planetary gear set 18, it being understood that when drum 17 is held against rotation, the planetary gearing 18 will effect a high speed gear ratio drive through the transmission in a well-known manner. In order to control and resist rotation of drum 17 I have provided a pair of cooperating brake shoes 19 and 20 each having a pivotal support 21 carried from the casing by a bracket 22 and each having an end 23 pivotally connected at 24 with a piston rod 25 actuated by a piston 26. Each piston operates in a cylinder 27 having a fluid pressure conduit 28 communicating therewith. The shoes 19 and 20 are normally spaced from drum 17 by springs 29 and 30 respectively, these springs being compressed when fluid under pressure is admitted to cylinders 27 from conduits 28.

Referring to Fig. 3 I have illustrated the drum 31 associated with the planetary gearing 32 for the second speed clutch or brake 14, this drum being engaged by shoes 19' and 20' under the influence of actuating pistons 26' in a manner similar to that described in connection with the actuation of pistons 26 of Fig. 2 for the high speed gear ratio. In Fig. 3 the cylinders 27' are extended outwardly beyond the fluid pressure inlets 33 so as to accommodate a clutch actuating element 34 herein illustrated in the form of an auxiliary piston normally held in its retracted position shown in Fig. 3 by reason of a detent 35 engaging a slot 36 in the piston 34. Each piston 34 is adapted, under conditions hereinafter referred to, to actuate shoes 19' and 20' under power applied by a spring 37 or other prime mover or source of power independently of the normal actuating means provided by the fluid pressure introduced by the conduit 33.

In Fig. 2, outward movement of each piston 26 in cylinder 27 under the influence of springs 29 is limited by engagement of one or more projections 26ª carried by the piston for engagement with the outer end of the cylinder.

In Fig. 3, each of the pistons 26' likewise is limited as to outer movement by engagement with projections 26ᵇ of a piston 34, the latter being limited by projections 26ᶜ engaging the outer end of cylinder 27'.

Slidably associated with each detent 35 is a control rod 38 having a groove 39, the control rods or plungers 38 being manually actuated through suitable linkage such as Bowden wires 40 and 41 extending to a suitable point for convenient manipulation by the vehicle driver. In Fig. 3 I have illustrated these wires 40 and 41 as being connected to a common handle or knob 42 slidable in a guide 43 carried by the usual dash 44. The handle 42 is connected with the wires through a rod 45 having a notch 46 adapted for engagement with a spring pressed ball 47 when handle 42 is pulled away from dash 44.

Referring to Fig. 3 it will be apparent that with the parts positioned as illustrated, the shoes 19' and 20' may be actuated for the second speed drive of transmission C by introducing fluid under pressure through conduit 33. When this fluid is introduced to cylinders 27', the pistons 26' respectively associated therewith are forced inwardly to actuate shoes 19' and 20' to hold the drum 31 against rotation. The detents 35 during this normal actuation of control clutch 14 engage slots 36 so as to hold pistons 34 against inward movement. However, in the event that the fluid pressure system should fail for any reason, the operator can pull handle 42 to engage notch 46 with the ball 47, such movement acting to register grooves 39 with the detents 35 thereby permitting these detents to move outwardly under the force of spring 37. When detents 35 are thus released, the springs 37 will move pistons 34 inwardly of cylinders 27', these pistons acting on pistons 26' to actuate the shoes 19' and 20' thereby enabling the engine to drive the vehicle through the second speed of the transmission. In this manner the vehicle can be driven under its own power to a point of convenience for repair of the normal clutch controlling mechanism, the parts then being restored to the positions shown in Fig. 3.

In order to restore the parts after actuation of the springs 37, it is only necessary to restore the pumping of the fluid under pressure through conduits 33, grooves 33ª respectively formed in cylinders 27' at the fluid inlets permitting entry of the fluid between pistons 26' and 34 when the latter is moved inwardly. When the fluid pressure is thus introduced, this pressure forces pistons 34 outwardly, compressing springs 37 and registering slots 36 with detents 35 to permit handle 42 to be pushed inwardly to lock pistons 34 in the position illustrated. In the event that the vehicle tends to move when the fluid pressure is introduced in restoring pistons 34 as aforesaid, the drum 31 being held by shoes 19' and 20', then the operator can arrest the drive where it is not desired by actuating the usual vehicle wheel brakes (not shown) as will be readily understood. The force of springs 37, while sufficient to arrest movement of drum 31, is sufficiently less than the force exerted by the fluid pressure acting on pistons 34 so as to permit the fluid pressure to restore these pistons.

It will thus be noted that I have provided auxiliary or supplemental means for controlling the transmission operating clutches or at least one of these operating clutches such as the second speed clutch illustrated in Fig. 3.

In order to selectively control the supply of fluid to the actuating mechanism for the various speed ratio controlling clutches, I have provided a fluid pressure control system illustrated in somewhat diagrammatic form in Fig. 4. The reservoir 48 contains a quantity of fluid such as oil 49. A pump 50 is suitably operated from a driving part of the engine A, clutch B, or transmission C, to supply oil under pressure through a conduit 51 leading to a valve casing 52 rotatably housing a distributing valve 53, this valve being adapted for rotary manual control by the handle 54. A release valve 55 may be interposed by conduits 56 and 57 between the pressure conduit 51 and the reservoir 48 so as to by-pass any excess delivery of pump 50.

The valve 53 cooperates with casing 52 to provide a fluid pressure supply space or chamber 58 and a low pressure space or chamber 59, these chambers 58 and 59 being separated from each other by the radially extending valve portions 60 and 61 engaging casing 52. The supply chamber 58 delivers oil under pressure from supply conduit 51 through a passage 62 extending through the valve to an outlet 63 illustrated in Fig. 4 as communicating with the conduit 28 of the high speed controlling clutch 13 of Fig. 2. The casing 52 also has further conduits adapted to be selectively registered with outlet 63 when valve 53 is rotated by handle 54 to selectively actuate the various speed ratio controlling clutches aforesaid.

Thus, conduit 33 as aforesaid is adapted to supply fluid under pressure to the cylinder 27' of Fig. 3 for controlling the second speed clutch 14 when outlet 63 is registered therewith. In similar manner conduit 64 is adapted to supply fluid to actuate the first speed controlling clutch 15 and conduit 65 is adapted to supply fluid to actuate the reverse controlling clutch 16 as will be readily understood. When conduit 62 is positioned so that it lies along a position indicated by the line 66 of Fig. 4 then the valve 53 is positioned for neutral in which case there is no delivery of oil from the outlet 63, the delivery of pump 50 being returned through the release valve 55 to the reservoir 48. Valve casing 52 also has a further conduit 67 which communicates at all times with the chamber 59 at such a point that the outlet 63 does not register with this conduit in any of the positions of movement of valve 53. This conduit 67 is the fluid return line and as shown in Fig. 4 communicates with reservoir 48 so as to return fluid from any of the clutch controlling supply lines which are not being supplied with fluid from the delivery 63.

In the normal operation of the driving mechanism engine A delivers its power through clutch B to transmission C and when control handle 54 is positioned so as to move the valve delivery passage 62 along the line 66, transmission C is thereby in its neutral setting and the power output shaft or propeller shaft 12 is not being actuated. In this position any oil delivered by pump 50 is by-passed back to reservoir 48 through the release valve 55. Assuming that the operator desires to start the vehicle in first or low gear of transmission C, he moves handle 54 to register the outlet 63 with conduit 64, the fluid under pressure then being delivered from pump 50 to actuate the brake shoes associated with the first speed controlling clutch 15 in a manner similar to that described and illustrated in connection with the high speed controlling clutch 13 of Fig. 5. When the operator desires to drive the vehicle in the second speed of transmission C, he then again moves handle 54 to register the delivery 63 with the second speed supplying conduit 33 and this causes pistons 26' to simultaneously actuate the shoes 19' and 20' of the second speed drum 31 of Fig. 3 whereby this drum is held stationary, it being understood that as soon as the delivery 63 has been moved beyond the first speed supply conduit 64 the first speed control clutch 16 is thereby released and conduit 64 is placed in communication with the return conduit 67. In a similar manner the operator may adjust valve 53 for actuating the controlling clutch of the high speed clutch 13 by positioning the valve as shown in Fig. 4. When it is desired to drive the vehicle in reverse, the delivery 63 is moved into alignment with the reverse conduit 65 for actuating the reverse controlling clutch 16 as will be readily understood. During the aforesaid selective positioning of delivery 63 with the various supply conduits, the pressure chamber 58 is in communication with the delivery conduit 51 so as to constantly supply the fluid under pressure to passage 62 of valve 53.

In the event of failure of the normal fluid pressure actuating means, the operator may pull the handle 42 in order to release the detents 35 which normally prevent pistons 34 from moving under the influence of their respective springs 37. On release of the detents 35, springs 37 are then free to actuate the shoes 19' and 20' of the second speed control clutch 14, drum 31 associated therewith being held stationary so as to provide the usual drive in the second speed ratio. Obviously, if desired, my auxiliary or supplemental means may be associated with other of the controlling clutches of transmission C and it will be understood that the particular arrangement shown in my drawing is merely illustrative of the fundamental principles of my invention.

While it is believed that from the foregoing description, the nature and advantages of my invention will be readily understood, I desire to have it understood that I do not limit myself to what is herein shown and described and that such changes may be resorted to when desired as fall within the scope of the appended claims.

What I claim is:

1. In a driving mechanism having a transmission of the epicyclic type, a drive controlling clutch for said transmission, said clutch comprising relatively movable frictionally engageable members, means for actuating said clutch, and additional means for actuating said clutch during operation of the driving mechanism independently of said first clutch actuating means each of said actuating means being adapted to provide the same speed ratio drive.

2. In a driving mechanism having a transmission of the epicyclic type, a drive controlling clutch for said transmission, power operated means for actuating said clutch to provide a drive, additional power operated means for actuating said clutch to provide said drive independently of said first clutch actuating means, said additional means including a clutch actuating element, and manually actuated means for controlling the actuation of said additional clutch actuating means.

3. In a driving mechanism having a speed ratio changing transmission, power operating means for normally controlling said transmission to establish varying speed ratio drives and manually controlled means supplementing said normal control to establish at least one of said drives, said supplemental means including a power actuated element.

4. In a driving mechanism having a transmission of the epicyclic type, a speed ratio controlling clutch for said transmission, means for actuating said clutch to provide a drive and additional means for actuating said clutch to provide a drive independently of said first clutch actuating means, said additional means including a power actuated element, and manually releasable latch means for restraining operation of said additional means.

5. In a driving mechanism having a speed ratio changing transmission, power applying means controlling said transmission, and means including an element actuated by power for controlling said transmission independently of said power applying means.

6. In a driving mechanism having a transmission of the epicyclic type, a speed ratio controlling clutch for said transmission, power means for actuating said clutch, power producing means independent of said first power means, and means actuated by said power producing means for actuating said clutch independently of said power means.

7. In a driving mechanism having a speed ratio changing transmission, fluid pressure means for controlling said transmission, auxiliary means including a prime mover for controlling at least one speed ratio drive of said transmission independently of said fluid pressure means.

8. In a driving mechanism having a speed ratio changing transmission, fluid pressure means for controlling said transmission, and auxiliary means including a spring prime mover for controlling said transmission independently of said fluid pressure means.

9. In a driving mechanism having a speed ratio changing transmission, fluid pressure means for controlling said transmission, auxiliary power operating means for controlling said transmission independently of said fluid pressure means, and manually actuated means for controlling said auxiliary means.

10. In a driving mechanism having a transmission of the epicyclic type, a speed ratio controlling clutch for said transmission, fluid pressure means for actuating said clutch, and auxiliary means for actuating said clutch independently of said fluid pressure means.

11. In a driving mechanism having a transmission of the epicyclic type, a speed ratio controlling clutch for said transmission, fluid pressure means for actuating said clutch, and auxiliary means including a spring for actuating said clutch independently of said fluid pressure means.

12. In a driving mechanism having a transmission of the epicyclic type, a speed ratio controlling clutch for said transmission, fluid pressure means for actuating said clutch, auxiliary means for actuating said clutch independently of said fluid pressure means, and manually actuated means for controlling said auxiliary means.

13. In a driving mechanism having a transmission of the epicyclic type, a speed ratio controlling clutch for said transmission, fluid pressure operated means for actuating said clutch, means for supplying fluid under pressure different from atmospheric pressure to said fluid pressure operated means, manually operating means for controlling the supply of said fluid to said fluid pressure operated means, and auxiliary means for actuating said clutch independently of said fluid pressure.

14. In a driving mechanism having a transmission of the epicyclic type, a speed ratio controlling clutch for said transmission, fluid pressure operated means for actuating said clutch, means for supplying fluid under pressure different from atmospheric pressure to said fluid pressure operated means, manually operating means for controlling the supply of said fluid to said fluid pressure operated means, a spring normally inoperative but adapted to supply power for actuating said clutch independently of said fluid pressure, means for transmitting the power of said spring to actuate said clutch, and manually actuated means for releasing said spring power, said fluid pressure acting to restore said spring to its normal position.

15. In a transmission of the planetary gear type having a plurality of planetary gear operated rotary elements and associated brakes for selectively braking said elements to provide a plurality of speed ratio drives through said transmission, power operated means for actuating said brakes to arrest rotation of said rotary elements respectively associated therewith, and additional power operated means for actuating at least one of said brakes to provide a drive through said transmission independently of the first said power operating means.

16. In a transmission of the planetary gear type having a plurality of planetary gear operated rotary elements and associated brakes for selectively braking said elements to provide a plurality of speed ratio drives through said transmission, power operated means for actuating said brakes to arrest rotation of said rotary elements respectively associated therewith, additional power operated means for actuating at least one of said brakes to provide a drive through said transmission independently of the first said power operating means, and a common brake operating element operably connected to one of said brakes and adapted for operation by both of said power operated means.

17. In a transmission of the planetary gear type having a plurality of planetary gear operated rotary elements and associated brakes for selectively braking said elements to provide a plurality of speed ratio drives through said transmission, power operated means for actuating said brakes to arrest rotation of said rotary elements respectively associated therewith, and additional power operated means for actuating at least one of said brakes to provide a drive through said transmission independently of the first said power operating means, at least one of said power operated means including a fluid medium.

18. In a planetary transmission having a planetary gear operated rotary drum and associated contractile band adapted when contracted to arrest rotation of said drum, means including an element operably connected to said band for contracting said band, and a plurality of independently operable force applying means adapted to actuate said band contracting means through the intermediary of said element.

19. In a planetary transmission having a planetary gear operated rotary drum and associated contractile band adapted when contracted to arrest rotation of said drum, means including an element operably connected to said band for contracting said band, and a plurality of independently operable force applying means adapted to actuate said band contracting means through the intermediary of said element, one of said plurality of force applying means including a spring and manually releasable means restraining operation of said spring.

20. In a planetary transmission having a planetary gear operated rotary drum and associated contractile band adapted when contracted to arrest rotation of said drum, means including an element operably connected to said band for contracting said band, and a plurality of independently operable force applying means adapted to actuate said band contracting means through the intermediary of said element, one of said plurality of force applying means including a spring and manually releasable means restraining operation of said spring, the other of said plurality of force applying means being adapted to restore said spring to its inoperative position subsequent to manual release thereof.

21. In a transmission of the planetary gear type having a plurality of planetary gear operated rotary elements and associated brakes for selectively braking said elements to provide a plurality of speed ratio drives through said transmission, power operated means for actuating said brakes to arrest rotation of said rotary elements respectively associated therewith, and additional means for actuating at least one of said brakes to provide a drive through said transmission independently of the first said power operating means.

22. In a planetary transmission having a planetary gear operated rotary drum and associated contractile band adapted when contracted to arrest rotation of said drum, power operated means for contracting said band, and additional means for contracting said band independently of said power operated means.

23. In a planetary transmission having a planetary gear operated rotary drum and associated contractile band adapted when contracted to arrest rotation of said drum, power operated means for contracting said band, additional means for contracting said band independently of said power operated means, and a common force applying instrumentality between said band and said plurality of band contracting means.

24. In a transmission of the planetary gear type having a plurality of planetary gear operated rotary elements and associated controlling devices adapted to provide a plurality of speed ratio drives through the transmission, each of said controlling devices including a member movable into frictional engagement with its associated rotary element, power operating means for selectively moving said members to vary the speed ratio drive through the transmission, and auxiliary manually controlled means for moving one of said members into frictional engagement with its associated rotary element to provide one of said speed ratio drives independently of said power operating means.

25. In a transmission of the planetary gear type having a plurality of planetary gear operated rotary elements and associated controlling devices adapted to provide a plurality of speed ratio drives through the transmission, each of said controlling devices including a member movable into frictional engagement with its associated rotary element, power operating means for selectively moving said members to vary the speed ratio drive through the transmission, said power operating means including a force transmitting element operably connected to one of said members for effecting said movement thereof to provide one of said speed ratio drives, and auxiliary manually controlled means for operating said force transmitting element independently of said power operating means to provide the last said speed ratio drive.

HERBERT F. PATTERSON.